(12) United States Patent
Beland et al.

(10) Patent No.: US 11,541,440 B2
(45) Date of Patent: Jan. 3, 2023

(54) SNAP-FIT EXTRUSIONS FOR FORMING PANELS

(71) Applicant: National Research Council of Canada, Ottawa (CA)

(72) Inventors: Jean-Francois Beland, Alma (CA); Francois Nadeau, Saguenay (CA)

(73) Assignee: National Research Council of Canada

( * ) Notice: Subject to any disclaimer, the term of this patent is extended or adjusted under 35 U.S.C. 154(b) by 0 days.

(21) Appl. No.: 16/936,995

(22) Filed: Jul. 23, 2020

(65) Prior Publication Data

US 2021/0023597 A1 Jan. 28, 2021

Related U.S. Application Data

(60) Provisional application No. 62/878,454, filed on Jul. 25, 2019.

(51) Int. Cl.
| | |
|---|---|
| *B21C 23/14* | (2006.01) |
| *B21C 37/02* | (2006.01) |
| *E04C 3/06* | (2006.01) |
| *B23P 19/02* | (2006.01) |
| *E04C 3/04* | (2006.01) |

(52) U.S. Cl.
CPC ............ *B21C 23/145* (2013.01); *B21C 37/02* (2013.01); *B23P 19/02* (2013.01); *E04C 3/06* (2013.01); *E04C 2003/0421* (2013.01); *E04C 2003/0439* (2013.01)

(58) Field of Classification Search
CPC .... E04B 2/8652; E04B 2/8635; E04B 2/8623; E04B 2/8611; E04B 2/86; E04B 2/84; E04B 2/64; E04B 2/63; E04B 1/16; E04B 1/04; E04B 1/02; E04B 2/8629; E04B 2001/2436; E04G 23/02; E04C 2/384; E04C 3/06; E04C 2003/0439;
(Continued)

(56) References Cited

U.S. PATENT DOCUMENTS

| | | |
|---|---|---|
| 2,981,383 A | 4/1961 | Dunn |
| 3,368,315 A | 2/1968 | Thurnau |

(Continued)

FOREIGN PATENT DOCUMENTS

| | | |
|---|---|---|
| CA | 1223423 | 6/1987 |
| CA | 2833490 A1 | 5/2014 |

(Continued)

OTHER PUBLICATIONS

Wei Chang Chen, Thesis entitled, Extrusion of Alumina Particulate Reinforced Metal Matrix Composites, University of British Columbia Thesis, 1994.

*Primary Examiner* — Theodore V Adamos
(74) *Attorney, Agent, or Firm* — Brett Reynolds

(57) ABSTRACT

A metallic extruded profile has two parallel skins interconnected by a set of at least two webs running between extrusion edges of the profile and snap-fit features on joining edges permitting two instances of the profile to snap fit together along the joining edges, where a first web that is closest to snap-fit features of a first joining edge, is a curved web viewed from the extrusion edges. The curvature allows for both the curved web and skins to participate in snap-fit deformation, allowing for the deformation to be distributed over a large area, for a stiffer snap fit, and reduced plastic deformation.

20 Claims, 5 Drawing Sheets

(58) Field of Classification Search
CPC .. E04C 2003/0421; B23P 19/02; B21C 37/02;
B21C 23/145
See application file for complete search history.

(56) References Cited

U.S. PATENT DOCUMENTS

| | | | |
|---|---|---|---|
| 3,436,881 A | | 4/1969 | Schlecht |
| 3,460,304 A | * | 8/1969 | Glaza ............... E01C 9/083 |
| | | | 52/588.1 |
| 5,102,253 A | * | 4/1992 | Pugliesi-Conti ...... E04B 1/6137 |
| | | | 403/31 |
| 5,410,855 A | * | 5/1995 | Clausen ............... E04C 2/08 |
| | | | 52/747.1 |
| 5,411,782 A | * | 5/1995 | Jarvis ............... E04H 4/08 |
| | | | 160/229.1 |
| 5,881,508 A | | 3/1999 | Irvine et al. |
| 6,036,398 A | | 3/2000 | Theodorou |
| 6,173,547 B1 | | 1/2001 | Lipson |
| 6,193,137 B1 | | 2/2001 | Ezumi et al. |
| 6,250,037 B1 | | 6/2001 | Ezumi et al. |
| 6,328,261 B1 | | 12/2001 | Wollaston et al. |
| 6,581,819 B1 | | 6/2003 | Aota et al. |
| 6,599,641 B1 | | 7/2003 | Nakamura et al. |
| 6,658,808 B1 | * | 12/2003 | Doherty ............... E04B 1/12 |
| | | | 52/579 |
| 7,861,911 B2 | | 1/2011 | Schafer et al. |
| 8,256,828 B2 | | 9/2012 | Carle et al. |
| 8,393,129 B2 | | 3/2013 | Arsene et al. |
| 8,590,767 B2 | | 11/2013 | Chun et al. |
| 9,091,061 B2 | * | 7/2015 | Dincel ............... E04C 2/20 |
| 2001/0015370 A1 | | 8/2001 | Matsunaga et al. |
| 2004/0068955 A1 | | 4/2004 | Aota et al. |
| 2004/0244321 A1 | * | 12/2004 | Dincel ............... E04B 2/8629 |
| | | | 52/503 |
| 2010/0212241 A1 | * | 8/2010 | Holroyd ............... E04C 2/36 |
| | | | 52/309.4 |
| 2016/0289960 A1 | * | 10/2016 | Darwell ............... E04B 2/8635 |

FOREIGN PATENT DOCUMENTS

| | | |
|---|---|---|
| EP | 0616262 A2 | 9/1994 |
| EP | 1123771 A2 | 8/2001 |
| GB | 2345704 B | 7/2000 |
| JP | H11107217 A | 4/1999 |
| JP | H11267859 A | 10/1999 |
| NZ | 616262 A | 9/2014 |
| WO | 2007039073 A1 | 4/2007 |
| WO | 2010132916 A1 | 11/2010 |
| WO | 2014046597 A1 | 3/2014 |

* cited by examiner ns for Forming
Panels

FIELD OF THE INVENTION

The present invention relates in general to extruded profiles for construction of lightweight structural panels, and in particular to an improved profile with snap fit ends for more reliable joining with higher resilient captive force and less plastic deformation by using a substantially curved proximal web with spring action.

BACKGROUND OF THE INVENTION

Extruded profiles formed of lightweight metals, such as aluminum-based alloys can be joined to form stiff lightweight panels, for use as walls, floors, ceilings, ramps, etc. of structures. As extruded profiles can only be as wide as the extruder, panels and larger structures are formed by joining profiles. Extruded profiles have top and bottom skins (usually <5 mm thick) joined by at least two webs that interconnect and separate the skins. Each web extends, between inner surfaces of the skins, a length of the profile. As profiles are extruded, the webs are integrated monolithically with the skins at "roots".

Herein the following coordinates are identified with the profiles for explanatory purposes, and not to limit any orientation of the profile. Viewed orthographically from an extruded edge (Y direction), only thicknesses of the webs and skins (and hollow channels they surround), are seen. A mean orientation of the top and bottom skins is the Z direction, and accordingly, viewed orthographically from the Z direction, the top or bottom skin is in view, but if there is some curvature of the profile, some part of joining edges may be in view. Viewed orthographically from an X direction, a joining edge is in view, although if the profile is curved, some part of the top skin and or bottom skin, is in view. If the profile is curved, there are also two joining edge planes that are defined by tilting the X-normal plane about the Y axis by a fixed angle, which is preferably smaller than 90°.

While not strictly necessary, the first and second skins are typically of uniform thickness (up to extrusion process limits), and equally separated at all X positions, viewed from the extruded edge. While a radial curvature of a profile (in the YX plane) is well-known for assembly to produce cylindrical structures, and more complex extrusion edges having a wavy (or other form) produced by sequences of curved segments thereof are possible, profiles generally have low curvature to simplify assembly, decrease weight, and provide surfaces of desired contour. Planar top and bottom skins are most common.

The webs may be parallel to each other, and have a similar thickness as the skins (within one order of magnitude). The webs are usually planar, with normals in the X direction, although some profiles have webs with normals in the ZX plane, as this increases shear stiffness of the skins, especially if the webs zig-zag or cross each other as seen from the extruded direction. While not necessary, the webs are typically spatially arranged at uniform separations to delimit (usually 2-8) open hollow channels of the profile. Typical profiles therefore have two opposite extruded edges (Y facing), which have the smallest surface area, followed by two opposite joining edges (X facing), and the biggest faces (by a factor of at least 4) are the external face of the skins (Z facing).

There are a variety of joining edge arrangements known in the art, including some that use complementary male/female features of the skins and/or leading webs (i.e. webs closest to the joining edge) to join the profiles together. Joining is generally performed by arranging complementary joining edges of two identical profiles in a common X-normal plane and running a seam in the Y direction, however for curved profiles, the joining edge planes are used instead of an X-normal plane.

There are a variety of joining processes that can be used to assemble the panels and structures from profiles, and these can impose various requirements on the joining edge arrangements. Some known profiles that are reinforced to allow joining by friction stir welding (FSW) (as FSW subjects the profiles to substantial downforce during joining), are shown in, U.S. Pat. No. 6,599,641 to Nakamura et al., WO 2007/039073 to Heinen et al., US 2004/68955 to Aota et al., and JPH11267859 to Kumagai et al. U.S. Pat. No. 6,599,641 teaches controlling root dimensions to permit higher stiffness joining.

Methods are known for preassembling profiles, to facilitate joining. To reduce or eliminate jigs, JPH11267859 teaches restraint structures with complementary fittings built into the profiles to be joined. To improve alignment of profiles prior to welding, CA 1223423 teaches interlocking beads, rims, and projections. The machine translation of WO 2007/039073 teaches that complementary lugs and grooves of complementary ends of profiles are made for "snap-on" connection, by separating a leading spacer from a female end to provide flexibility. Snap-fit connection is desirable for aluminum profiles.

Aluminum has limited elastic deformation. Permanent plastic deformation results if this limit is passed. As elastic resiliency is the force that maintains the snap-fit connection, there is a tendency to lose stiffness of the join to the extent that deformation is plastic, and further plastic deformation reduces regularity of dimensional stability the joined profiles. Known designs rely almost exclusively on deformation of the skins between the end and a proximal web of the profile.

An alternate embodiment of WO 2007/039073, illustrated as FIGS. 12-13, show a spindly structure for lever action clamping of profiles together. The design illustrated shows that a bulk of the weight of this structure that is permanently added to the profile, is provided by a connecting strut 27. Strut 27 does not improve stiffness of the skins once joined. A stiffness to weight ratio is thus reduced.

U.S. Pat. No. 5,410,855 to Clausen et al. teaches an aluminum profile with a male end and female end, the male end having an internal transverse V-shape web 16 that is designed to be inverted by application of a force from a tool 3 that is inserted into a leading hollow segment of the male end. As such the V-shape web 16 is a web that is kinked in its middle to allow for contraction of a tip of the profile during insertion of the profile into registration, and then is expanded by operation of the tool 3 to lock the joint. It is stated that the illustrated V-like shape could alternatively be an arcuate configuration. As shown, the angle of the V is about 120° in a contracted tip position, and this angle grows beyond 180° to about 200°. This deformation is spatially limited to small parts of the web 16 (especially if notches 19 are used), ensuring permanent plastic deformation, as is required to invert the V-like shape. Their joint is "not primarily based on the inherent resilient back pressure from the webs 15, but on the locking pressure exhibited by the permanently deformed web 16." Nonetheless, Clausen et al. states that an "arcuate shape" can be used instead of the V-like folded shape.

An expansion tool 3, based on a hydraulically/pneumatically operated hose 32, and an alternative use of a "rolling means" are stated to be used for inverting the V-like shape. Clausen et al. does not mention a maximum length of profile that can be joined with this method, despite the statement that the joints have been tested. Applicant's experience with Al suggests that the extruded length must be relatively small to allow for controlled deformation along a web that is itself relatively narrow, but is thick enough to apply a permanent compressive load to counteract the "converging walls 11,12" as originally formed. It can be a critical feature for economics of extruded profiles, that each profile contributes a substantial surface area to a panel. If the profile's extrusion length is limited to enable assembly, the profile may be uneconomic for a wide range of applications.

In order to work as taught, the V-shape web 16 must be located close to an insertion tip of the profile. As is best seen in FIG. 4, the V-shape web 16 (where it meets the skins/coupling features) is about the same distance as a thickness of the V-shape web 16, away from a bottom edge of the profile. The V-shape web 16 meets the profile at the locking tabs 25, and a root centre of the V-shape web 16 is clearly shown surrounded by the locking tab 25, (regardless of whether groove 19 is provided). To provide a substantial tab for rigid coupling, and to provide the inversion of the V-shape web 16 with the inverted tip abutting wall 27 (FIG. 1) as shown, seems to require that the web 16 meet the tab 25. As such, a locking wall (between 15 and 18 of FIG. 4) of the joint is further from the tip than the root centre, and the root centre is more than 2× a mean thickness of the web 16 from the tip.

Accordingly there remains a need for improved snap-fit extruded profiles that have greater stiffness when snap-fit together, weigh less, and provide higher levels of snap-fit rigidity (resiliency force) by reducing plastic deformation during snap fit. Furthermore snap-fit connection of the extruded profiles is preferably performed simply and without substantial limitation on profile width.

SUMMARY OF THE INVENTION

The prior art fails to teach or suggest the use of simply-curved proximal webs to increase resiliency force, while distributing load over a wider area for reduced plastic deformation. By more uniformly distributing deformation over a wider area, elastic response of the profiles is increased during the snap-fit, and plastic deformation can be reduced or avoided. These curved webs allow their roots on both sides to move together/apart during snap-fit deformation, and distribute strain over two closed paths (one through the simply-curved web, the other via the skins to a next web) as opposed to only deforming the skins, as generally provided in the prior art. The skins and sections of the curved web are oriented so the skins, which also have spring action (resiliency), act cooperatively. A coordinated action of the skin's elastic deformation and the deformation of the curved webs, distributes the deformation during the snap fit. This substantially increases the force necessary for the snap fit, and also substantially increases resiliency of the snap fit connection. Herein resiliency is understood as the amount of energy required for the elastic deformation of the system during snap fit connection or disconnection. Typically sloped snap-fit features are used allow for gradual extension for snap fit coupling, but no such mechanical advantages to snap fit release, are used to increase a barrier to release once snap-fit. The curved web may have roots that are substantially aligned to avoid a shearing of the skins during deformation, as would be introduced with diagonal webs.

The result is a greater stiffness of the snap-fit structure with less plastic deformation. The design distributes flexure over the skins as well as the curved web to improve stiffness after snap-fit connection, and reduce plastic deformation.

Accordingly, a metallic extruded profile having two skins with inner, and outer surfaces, is provided: the skins are interconnected by at least two webs that integrally meet the inner surfaces of both skins at respective roots; an outer peripheral edge of the profile has a first joining edge; and snap-fit features on the first joining edge permit the profile to snap fit together with a complementary profile joining edge, by deforming the skins and the first web. In this profile, a first web, closest to the snap-fit features of the first joining edge, is curved; a curvature of the first web is visible from the extrusion edges, the curvature comprising a maximum deviation of the first web from a line segment connecting the first web's root centres that is at least twice the first web's mean thickness. The profile is adapted to deform during snap-fit deformation with the first web elastically deforming to change a separation of root centres and the skins between the first web and a neighbouring web deforming elastically. For example, the elastic deformation of the first web includes plastic deformation affecting less than 5% of a length of the first web.

Also accordingly, a metallic extruded profile having two skins with inner, and outer surfaces, is provided: the skins are interconnected by at least two webs that integrally meet the inner surfaces of both skins at respective roots; an outer peripheral edge of the profile has a first joining edge; and snap-fit features on the first joining edge permit the profile to snap fit together with a complementary profile joining edge, by deforming the skins and the first web, the snap-fit features including a sloped entrance surface extending from a joining edge proximal point to a first web proximal point for wedging open the first joining edge. In this profile, a first web, closest to the snap-fit features of the first joining edge, is curved; a curvature of the first web is visible from the extrusion edges, the curvature comprising a maximum deviation of the first web from a line segment connecting the first web's root centres that is at least twice the first web's mean thickness; and the line segment is recessed from the first joining edge by at least one of: three times a mean thickness of the first web in an undeformed state; and 50% further than the first web proximal point.

In either profile the first web may arc away from the first joining edge. The snap-fit features on the first joining edge may be designed to spread apart during snap-fit deformation, and snap-fit deformation increases a length of the line segment, and decreases a curvature of the first web.

In either profile each web other than the first web, except possibly a second web nearest a second joining edge opposite the first joining edge, are primarily planar sheets of constant thickness. Each web may be oriented locally perpendicular to the skins, or at a same angle of 30-90° (more preferably 35-90°, or about 45-90°) with respect to the skin. The first web may have at least one section consisting of a uniform thickness sheet, of constant curvature. The shape away from the at least one curved section, may be substantially linear. The first web may have a uniform thickness, away from its roots. The first web, away from its roots, may have a uniform thickness except at the at least one section, which is thinner. The first web may include exactly one curved section, the curve having a shape that is approximately parabolic, elliptical, circular, hyperbolic or cycloidal. The first web may include at least one section having a mean radius of curvature of between 0.25 and 0.75 times a separation of the skins.

The webs and skins may have uniform respective thicknesses away from the roots, these thicknesses differing by less than a factor of 2, more preferably a factor of 1, more preferably by 50%.

The profile may comprise a second joining edge opposite the first joining edge, the second joining edge being complementary to the first joining edge with a second web closest the second joining edge. The second web may have a larger radius bend at the root than any other web of the profile, may be a flat web oriented locally 90° to the skins, and may have a greatest mean thickness among all webs and the skins of the profile. The second web may be a curved web with a complementary curvature to that of the first web.

The snap fit features on a first side of the first joining edge may comprise a pair of meeting surfaces defined by sloped surfaces on entrance and retraction sides, respectively, and a land between the sloped surfaces, for coupling by application of a compressive force between aligned profiles, the retraction side having a steeper slope than the entrance side. The snap fit features of the first joining edge on a second side opposite the first side, may comprise: a sloped meeting surface, and one of a complementary detent or recess; or one of a cradle surface and complementary cylindrical pivot.

Also accordingly, a method is provided for supporting a snap-fit connection of a metallic extruded profile, with two parallel skins interconnected by a set of at least two webs, the method involves: providing snap-fit features on the leading edges and/or a proximal web of a first joining edge of the profile, the snap-fit features including at least one detent mechanism; and providing the proximal web extending between the skins with a shape, viewed in the extruded direction, having a curvature, and a length that is at least 15% greater than a distance between respective root centres of the proximal web, whereby the proximal web exhibits elastic deformation for separating the root centres sufficient to deform the profile a depth of the detent mechanism to support a snap-fit connection.

A copy of the claims is incorporated herein by reference. Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Herein a profile is described having a curved web proximal to a join end to participate in a snap-fit deformation. The curved web has a length between the skins that is greater than a separation of the skins (e.g. 15% greater, at least 20% greater, or between 25% and 150% greater), over which deformation is distributed during snap-fit. The curved web provides a spring action, tending to restore an in-built separation of root ends of the curved web. The spring action of the curved web cooperates with spring action of the skins, including the skins between the curved web and its neighbouring web, to distribute the deformation over a larger area across two parallel paths, while keeping the elastic bodies relatively close to the snap-fit join for improved stiffness and resilience of the snap fit. As both the skin deformation and curved web deformation cooperate but independently deform, the resilience of the snap fit is a sum of the restorative forces of the two cooperating elasticities. With the cooperating deformations implicated in the snap fit, greater control of the deformation is ensured, and greater clamping force is provided for the same material properties. The curved shape itself may be primarily symmetric, and the roots may be sufficiently aligned in a snap-fit direction to encourage bending of the skins symmetrically, which encourages only the movement of snap-fit features in a direction that is required for the snap-fit. Herein "curved" is not intended to require a constant radius of curvature.

The curvature is not a de minimis deviation from planarity, such as what results from ordinary root curvature, but requires a centre line of the curved web to deviate by a distance of at least a mean thickness of the curved web from a line connecting the centres of the roots. The curvature is preferably simple, in that it's centre line has a radius of curvature at each point, and the centres of curvature of the points all lie on a common side of the centre line (the curvature does not bend in inward at one point and outward at another), although this is not necessary, and some recurve shapes, like the shape of a Turkish bow, can work equivalently with only a minor stiffness to weight penalty. As both the skin deflection and the curved web provide large surfaces over which deformation is applied, plastic deformation from the snap-fit motion can be reduced (or even eliminated for a nominal extrusion) during snap fit: as such the profile may exhibit plastic deformation over less than 10% of the length of the curved web, or less than 8%, 5%, 3%, 2% or 1%. Reduced plastic deformation ensures better metal integrity, durability, and dimensional stability, and allows structures composed of the snap-fit profiles to have greater stiffness and stability under load. Furthermore, larger deformations, with deeper detent/recess mechanisms, can be provided to better ensure a tight snap fit despite variabilities of extruded parts.

Figure 1:
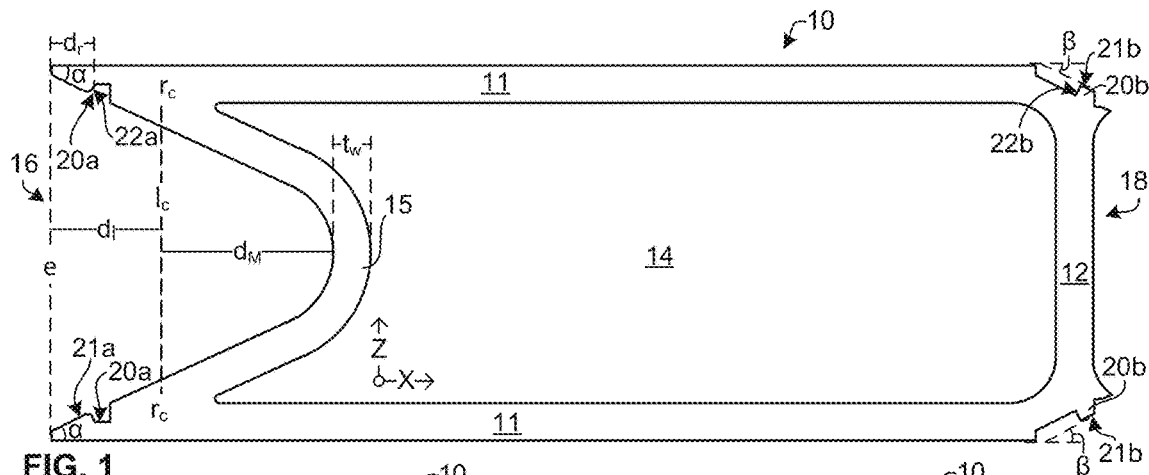
FIG. 1 is a schematic illustration of an orthographic projection in an extruded direction, of a profile with a curved proximal web, in accordance with an embodiment of the present invention.

FIG. 1 is a schematic illustration of a truncated profile 10 viewed from an extrusion edge thereof. The profile 10 is an extruded metal such as a high strength alloy of Al. The profile 10 consists of skins 11, separated by webs 12, including a curved web 15, which collectively surround a single hollow channel 14. The skins 11 happen to be flat, parallel, planar sheets that extend between opposite join ends 16,18. As will be appreciated by those of ordinary skill, most profiles have 3-8 hollow channels between webs, whereas the illustrated profile 10 has only two webs 12,15, leading to only one hollow channel 14. This is a convenience for illustration, as inclusion of multiple hollow channels 14 shrinks the features of relevance.

The profile 10 has complementary snap-fit features 20a,b at respective joining edges 16,18 near junctions of the skins 11 with the end webs 15,12 (which are proximal webs of the respective joining edges). The snap-fit features 20a,b are schematically shown as meeting surfaces including an entrance sloping surface 21a,b (having angles identified as α and β), terminating in a land or cusp, followed by a (relatively steep) retraction sloping surface 22a,b. The entrance surfaces, having mild slope (shallow angle of 15°-60°; more preferably 18°-50°; 20°-40°; or 25°-48°) reduce a separation of the skins 11 per unit of advance, and allow for more gradual and controlled snap-fit action, until the lands meet. After the lands meet force is only needed to ensure the land on the male end starts into the retraction side of the female end, thereafter elastic response clamps the snap fit features. The snap-fit features 20a,b are detents. It should be noted that the relatively simple detent structure illustrated is exemplary only, and various other snap-fit features that call for varying skin separation of the joining end 16 (Z direction), could equally take advantage of improved stiffness of curved webs.

The curved web 15 meets the skins 11 at the joining end 16, at roots having centres ($r_c$), which are aligned in the X direction to encourage symmetric deformation during snap-fit. The curved web 15 is on (female) joining end 16 that is designed to flex to separate $r_c$'s thereof during snap-fit, and the web 12 is a planar, orthogonal web, particularly apt for resisting axial loads (in the Z direction). Joining edge 18 is stiff, which is particularly useful for FSW joining panels from the profile 10, particularly if the FSW joint is made at the cusp or land, as the detent is substantially aligned with a centreline of web 12. This is convenient for manipulating or processing a panel formed of the snap-fit profiles 10. A compressive force applied on the panel, directed along web 12 in the Z direction, will serve to increase clamping of the snap-fit features, and a rigidity of the snap-fit. This force may be required for further joining, as by friction stir joining (e.g. FSW, FSDB), or other bonding techniques that require substantial forces in the Z direction. The snap-fit features 20b, positioned as shown, may be destroyed by friction stir joining, eliminating any weakness in the snap-fit joint.

It will be noted, unlike the prior art to Clausen et al., whose retraction surface (i.e. the wall between 15 and 18 that retains the join of the profiles in tension from the X direction after snap-fit) is further from the leading edge of the profile than the root centre, and is generally in line with the distal surface of the root, the embodiment of FIG. 1 has $r_c$s located further from the leading edge (e) of the profile than the retraction surfaces 22a. Furthermore, a line segment $l_c$ between the $r_c$s, is recessed from e by a distance $d_l$ that is greater than a minimum thickness ($t_w$) of curved web 15, greater than twice $t_w$, and is shown about 5×$t_w$. As mentioned previously, the curvature of web 15 is substantial. The maximum deviation ($d_M$) is about 5×$t_w$ as shown. A recess depth ($d_l$) of the line segment from e is more than 150% (i.e. 50% more than) that of retraction surface 22a ($d_r$), and is shown to be about 2.5×$d_r$. Note that $d_r$ is a sloped surface, and is shown rather steep, to make a difference between a midpoint and extremities indistinguishable, however, if a separable snap-fit connection is desired, another snap-fit structure might be preferred, and a much more gradual retraction slope would be defined. If so, a mid-point of the slope would be used to measure $d_r$. While this configuration is good for the present invention, it is expected to be unworkable for the profile of Clausen et al.

Figure 2:
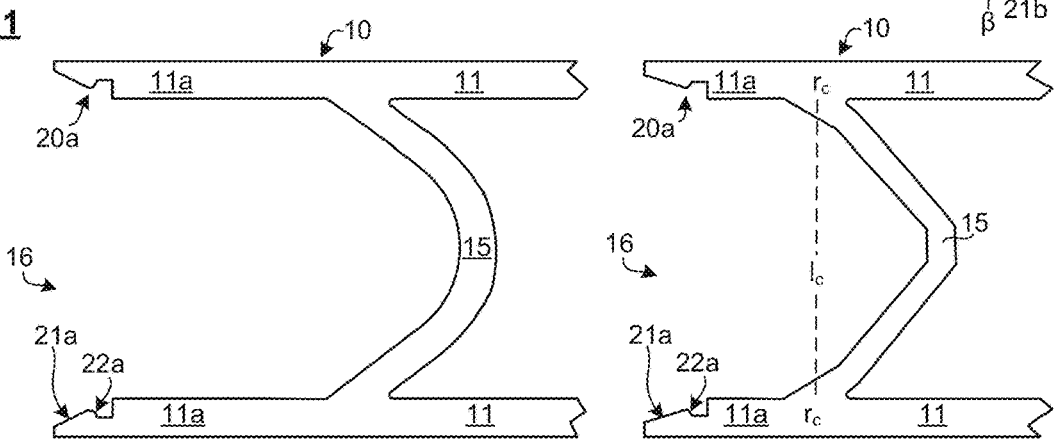
FIG. 2 is a schematic illustration of a first variant of the embodiment of FIG. 1, in which the curved web is recessed from a joining face of the profile.
Figure 3:
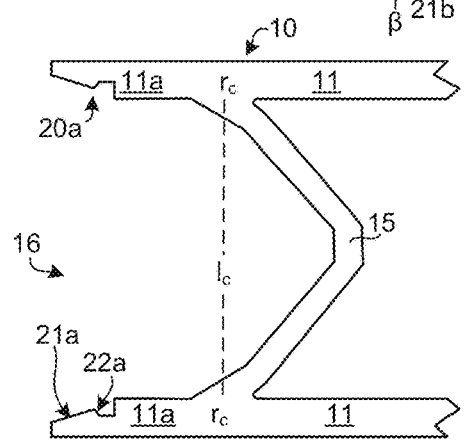
FIG. 3 is a schematic illustration of a second variant of the embodiment of FIG. 1 in which the curved web has varied thickness, and is provided by a set of linear segments.
Figure 4:
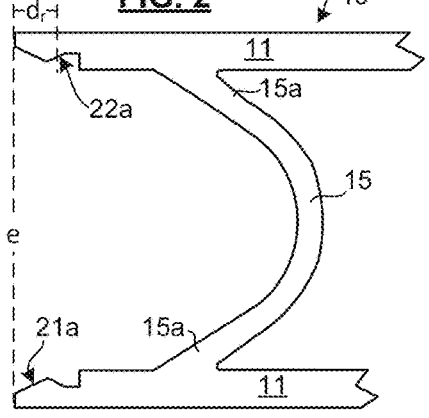
FIG. 4 is a schematic illustration of a third variant of the embodiment of FIG. 1 in which the curved web is thinner than the skins.

FIGS. 2-4 are schematic illustrations of variants of the profile 10 with curved web 15, showing only the joining end 16. Herein corresponding reference numerals identify the same features in different drawings, and are only described in terms of the variations. In general the embodiments of the invention are to be understood as including each variation, and collection of variations from the variants.

FIG. 2 schematically illustrates a profile 10 in which the snap-fit features 20a are on leading skin segments 11a of skins 11 that extend in front of curved web 15. While this allows more bending of the leading skin segments 11a, and discourages deformation of the skin 11 and curved web 15, it will be appreciated that with a corresponding thinning of the curved web 15, and skin 11, or a thickening of leading skin segments 11a, a balanced distribution of the deformation can be achieved. With a designed coupling (root curvatures) and these thickness, an increase in deformation area can be provided that delays onset of plastic deformation for a given stiffness material and detent depth. In FIG. 2, $d_r$ remains the same as in FIG. 1; $t_w$ is about 10% less than in FIG. 1 relative to skin thickness, (i.e. $t_w$ is about 90% of skin thickness); $d_M$ is about 3¼ $t_w$; $l_c$ is moved back by the introduction of 11a, and accordingly $d_l$ is closer to 10×$t_w$, and more than 5×$d_r$.

FIG. 3 schematically illustrates a profile 10 with minor leading segments 11a, and a piece-wise linear curved web 15. While each of 5 segments of the piece-wise linear curved web 15 is linear, the angles between the segments approximate a simple curve. The segments include two root segments, each coupled to a respective deforming segment, and a mid segment coupling the two deforming segments. The two deforming segments are symmetric, and longer and thinner than the root segments. The deforming segments are therefore most readily flexed, and contribute most deformation of the web 15, even if it may not displace more than the mid segment. The curved web 15 deforms to allow Z direction separation of the snap-fit features 20a, and associated pivoting moments about the Y axis. A ratio of the moment about the Y axis and Z direction displacement can be chosen by selection of the tapering and spacing of the segments, and by a length and thickness of the leading skin segments 11a. While leading skin segments 11a are shown marginally thinner than skin 11, it could be reversed. While piece-wise linear curved webs 15 tend to concentrate stress within the curved web 15, they offer many parameters to control distribution of deformation throughout the snap-fit. By engineering a weakest part of the deformation path to be between the roots of curved web 15, plastic deformation may be precluded at the exposed leading skin segments 11a. A relatively large root, uniformly thin web, and smooth curvature may be preferred to maximize distribution of the elastic deformation. In FIG. 3, $d_r$ remains the same as previous; $t_w$ is about 85% of skin thickness; $d_M$ is about $4.5 \times t_w$; $l_c$ is moved back by the introduction of 11a, and accordingly $d_l$ is about $7 \times t_w$, and almost $4 \times d_r$. Angle α is also shown as a smaller angle, providing a more gentle slope.

FIG. 4 schematically illustrates a curved web 15 that has a mean thickness of about 60% of the skin thickness. A taper is provided from the root to a uniform high curvature segment of the curved web 15, the taper provided in a substantially linear segment. The linear segments make up about $\frac{1}{8}^{th}$ of the extent of curved web 15. In FIG. 4, $d_r$ remains the same measure as previous, but the retraction surface 22a is far more gradual, almost symmetric with the entrance sloped surface 21a; $t_w$ is about ⅔ skin thickness; $d_M$ is over $4 \times t_w$; $l_c$ is moved back by the introduction of 11a, and accordingly $d_l$ is about $7 \times t_w$, and over $4 \times d_r$. Angle α is also shown with an angle, intermediate the embodiments of FIGS. 1,3.

Figure 5:
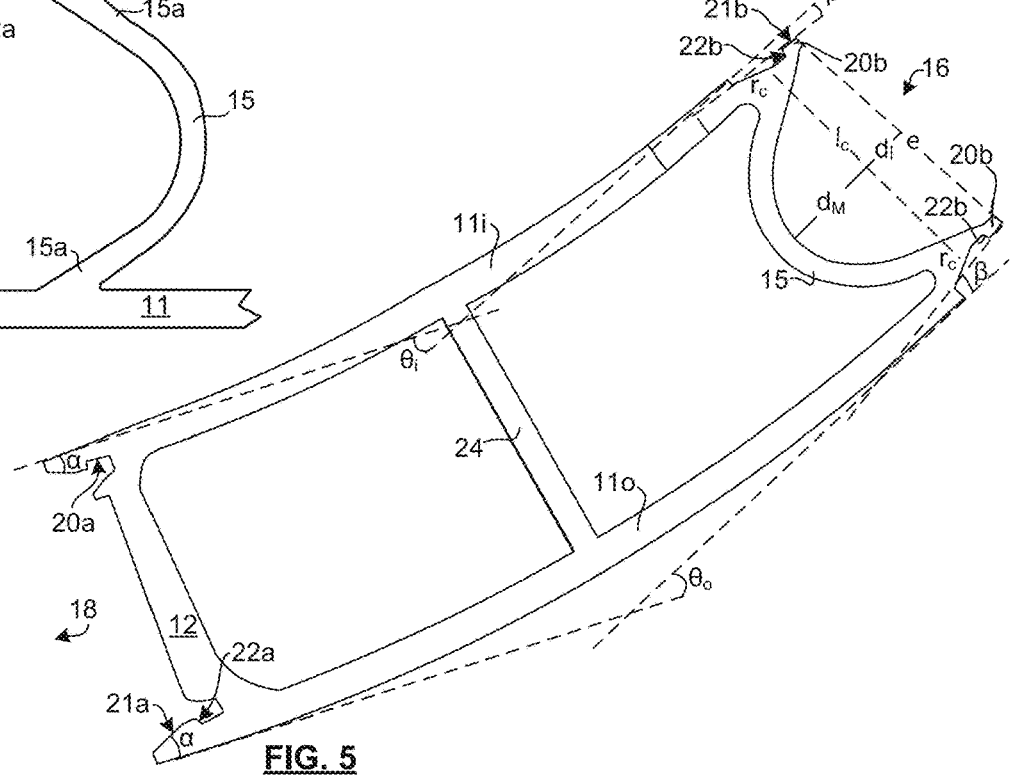
FIG. 5 is a schematic illustration of a fourth variant of the embodiment of FIG. 1 in which the curved web is adjacent to a male joining face of the profile, and the profile is arcuate.

FIG. 5 schematically illustrates a variant in which the curved web 15 is designed for compression instead of extension during snap-fit. The profile is curved instead of planar. The variant of FIG. 5 also has a web 24 that is proximal to neither joining end 16,18. Curved web 15 is designed to operate in compression rather than extension, but the deformation is still advantageously distributed over the arcuate path, and is supplemented by elastic deformation of the skins 11i,o between the curved web 15 and a neighbouring web 24. The sloping surfaces 21b,22b accordingly face away from one another, unlike the previous variants. In other words, joining end 16 is a male end, and joining edge 18 is female, which is reversed from previous variants.

FIG. 5 also shows a profile that is arcuate. Such profiles are generally assembled to form cylindrical or rounded panels, be they full enclosures (360°), half-pipe structures (180°), or quarter-pipes (90°). It is known to assemble arcuate and flat (or differently arcuate) profiles to form structures having rounded transitions, for example from a wall to a ceiling and back to a parallel (or not) wall, as may be useful for vehicles, and aerodynamic structures such as windswept structures. While the profile can, in principle, have any curvature in the extruded direction, and need not even have parallel skins, typically the arcuate profile will define a circular arc, which is to say an inner skin 11i and outer skin 11o will have a respective radii of curvature ($r_i$,$r_o$), and $r_o = r_i + a$ profile thickness. Typically $r_i$ is greater than a length of the profile, which can be measured as an angle $\theta_i$ of a circle swept by the profile, specifically between the retraction surfaces 22a,b. As such, tangents of the skin 11i at retraction surfaces 22a,b meet at secant points (at a distance $r_i \sec(\theta_i/2)$ from centre of curvature), defining the angle $\theta_i$. Likewise for the secant point of skin 11o. if the profiles form rounded bends or quarter-, half-, or full-pipe structures, $\theta = \theta_i = \theta_o$, and $\theta \times k = 360°$ for an integer k. If so $l_c$, and e are radial from the centre of curvature (not in view). $d_M$ and $d_l$ are measured along midpoints of e, $l_c$ and web 15. $r_c$ is measured from the midpoint of the retraction surface 22b to e. When the profile 10 is arcuate, angles α,β are measured relative to the tangent locally. In the variant of FIG. 5 $d_r$ is about 70% skin thickness, and about 85% $t_w$; $t_w$ is about ⅔ skin thickness; $d_M$ is $4.5 \times t_w$; $d_l$ is more than twice $d_r$ and about $2 \times t_w$.

Figure 6A:
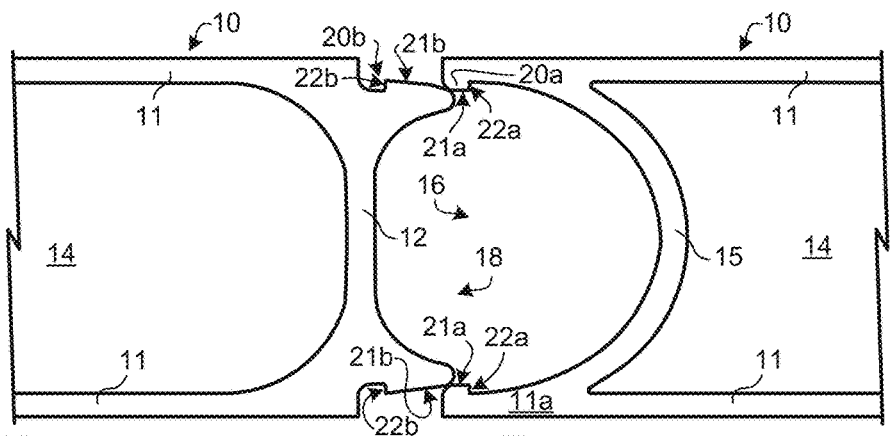
FIGS. 6A,B are schematic illustrations of complementary meeting faces of two profiles prior to, and during, snap fit connection.

FIGS. 6A,B are schematic illustrations showing snap-fit of two profile ends. In this variant the skins 11 and webs all have a common thickness, but a root curvature of the web 12 is much higher than for web 15. The female profile end 16 is a further variant of that of FIG. 1, with minimal leading segments 11a, and semi-circular curved web 15, which circle has a diameter marginally greater than a separation of the skins 11. The semi-circular curved segment 15 is formed easily and has good balance between snap-fit force and added weight of the profile. An advantage of a semi-ellipsoidal curve oriented with a major axis oriented parallel to the skins, and a minor axis greater than the separation of the skins 11, is a greater extent of elastic deformation: an advantage of a semi-ellipsoidal curve oriented with a major axis greater than the separation of the skins 11 oriented in the Z direction, is a decreased mass added by the web. Elastic deformation will include less linear separation and more pivoting.

This variant profile 10 has retraction surface 22b offset slightly from a centre line of the web 12, but e (not drawn) still exceeds the centre line when snap-fit is complete. It is preferable to at least overlap the leading edge of the joining edge 18 with the web 12 if the profiles are to be joined by friction stir joining: more preferably the overlap brings the leading edge of the joining edge past the centre line as shown, and most preferably the leading edge passes the whole web 12. However a shoulder of the FSW tool may allow for a not-strictly overlapping leading edge of joining edge 18 to be FSW joined with web 12.

Figure 6B:
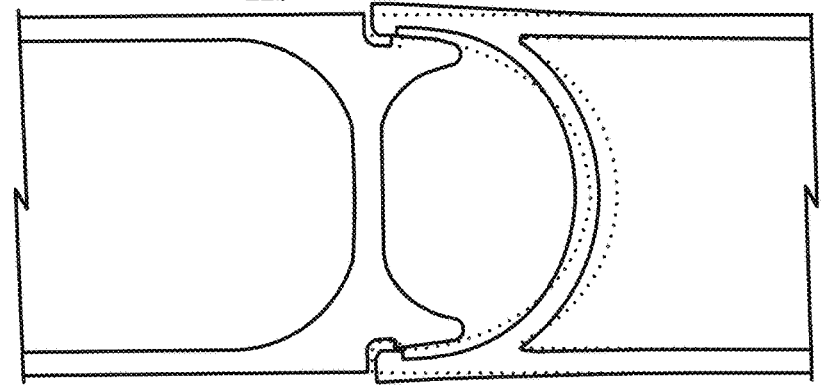

FIG. 6A shows the snap-fit pose just prior to substantial compressive forces are applied in the X directions (+/−). FIG. 6B has no reference numerals to avoid occlusion of the profile, which is shown near maximal deformation during the snap fit, which is most apparent on the female joining edge 18. FIG. 6B shows, in dotted line, the shape of the relaxed profile for comparison. While some deformation of a cusp of the snap-fit features 20a,b is expected, it is negligible compared with the deformation of the skins 11 and the curved web 15 during the snap-fit on the female joining edge 18. The visual comparison shows how the curved web 15 flattens out, becomes slightly skinnier from Poisson's effect, and how these variations are distributed over broad surfaces. The comparison also shows how the skins 11, between the curved web 15, and its neighbouring web (not in view) participate in the deformation, and contribute resiliency.

Figure 7:
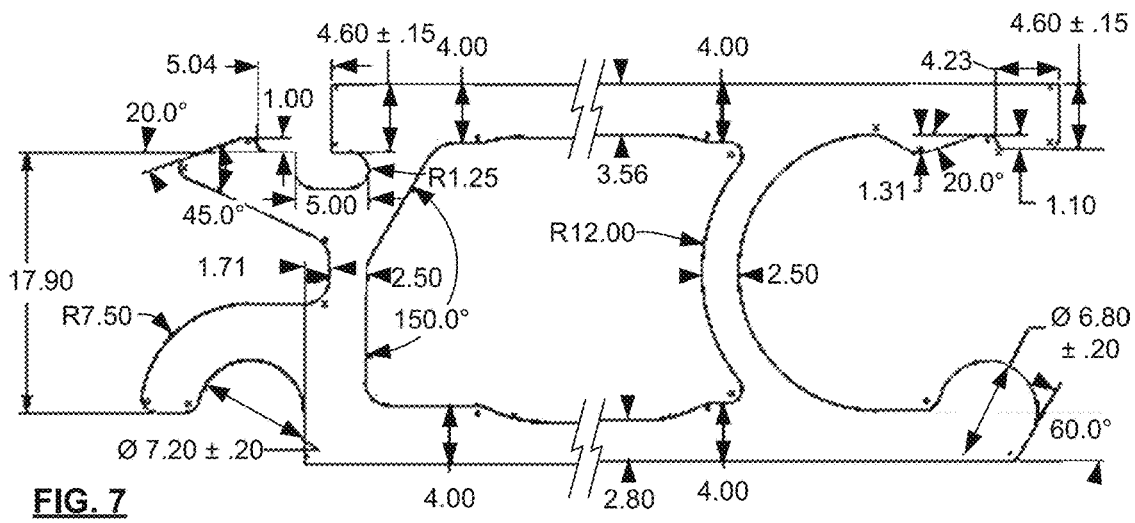
FIG. 7 is a detail illustration of a fifth variant of the embodiment of FIG. 1, in which snap-fit is achieved by a hook and pivot motion.

FIG. 7 is a hinge-action snap-fit variant with engineering detail. The only omitted details are the number of channels, and webs. The only webs shown are two proximal webs at either joining sides. The male end's proximal web has a substantial thickening throughout most of its Z directed extent, to support a pivot cradle below, and a snap-fit feature (as well as a slot useful for certain arc welding processes) above. Substantial thickness is added at the joining edges 16,18 to allow for a snap-fit connection with a pivoting motion about a cylindrical nose on the female joining edge, and producing a higher stiffness panel. Some attention to the extrusion may be required to provide sufficiently smooth surfaces for the rotating snap-fit coupling according to this embodiment, but known extrusion processes are satisfactory without any expensive reforming or machining processes.

Figure 8A:
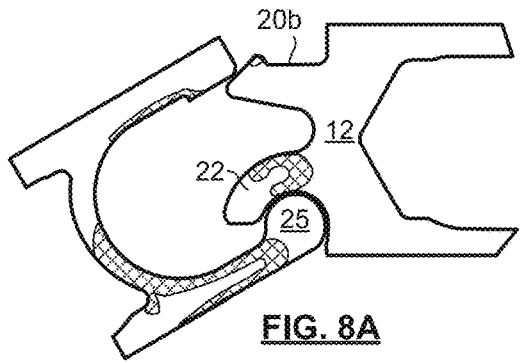
FIGS. 8A,B are schematic illustrations of complementary meeting faces of two profiles according to FIG. 8 prior to, and after snap fit connection, further showing a stress map during snap-fit and plastic deformation regions, respectively.
Figure 8B:
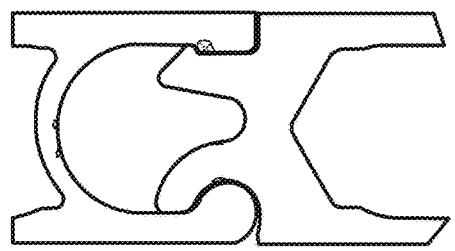

FIGS. 8A,B are schematic illustrations of joining edges of the hinge-action snap-fit variant of FIG. 8, being joined. The hinge-action snap-fit variant replaces one of the snap-fit features, with a cylindrical pivot 25 and a cradle wall for supporting the pivot 25. The cradle wall is provided by an ear 22 that extends from a locally thickened web 12, opposite a branch featuring snap-fit feature 20b. FIG. 8A shows poses of relevant ends of the two profiles prior to joining, and FIG. 8B shows the completed snap-fit connection.

The embodiment of FIG. 8 was modeled. FIG. 8A overlays a map of strain in the profile ends throughout the snap-fit process, illustrating the degree to which the deformation is spread across the curved web 15 and the skins 11. Some deformation is manifest at the male joining edge 18's ear 22 that supports the cylindrical pivot 25 at the angles where the strain is greatest. Note that none of these strains would have been exerted on the profile ends in the pose of FIG. 8A, rather these are the peak strains observed throughout the snap-fit process. The identified areas had peak stresses of 55-270 MPa. FIG. 8B overlays a map of modelled plastic deformation as a result of the deformation. Two tiny plastic deformation regions are observed on the ear 22; a sizable region is found around the detent of the snap-fit feature 20b, and a small region near a middle of the curved web exhibits some plastic deformation. The plastic deformation is therefore limited to areas that do not affect dimensions of the panel. The magnitude of the plastic strain identified are 0.4 to 0.5%.

Figures 9A, 9B:
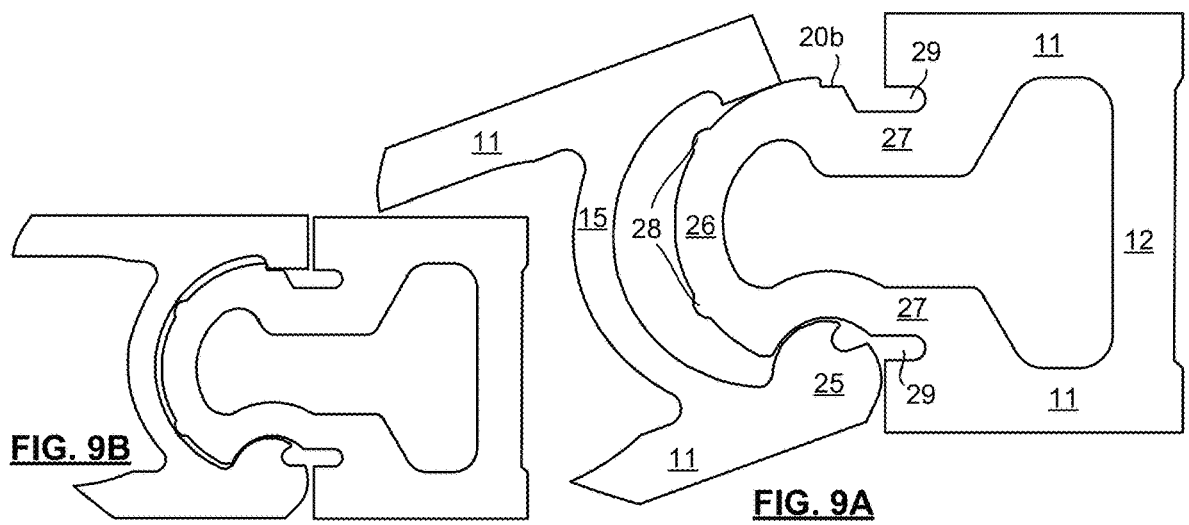
FIGS. 9A,B are schematic illustrations of complementary meeting faces of two profiles according to a seventh variant of the embodiment of FIG. 1, prior to, and after, snap fit connection.

FIGS. 9A,B are schematic illustrations showing the snap-fit connection of two profile ends. The joining edges of two profiles are shown, that allow for hinge-action snap-fit. In this embodiment both joining edges having curved webs proximal the joining edge. A female joining end (left) as shown resembles joining end 16 of FIG. 7, with both pivot 25 and snap-fit feature 20a at opposite skins joined by curved web 15. The male joining end (right) provides an orthogonal web 12, and a herniated curved web 26 that extends by short segments 27 parallel and between the skins 11. The herniated web 26 defines a hollow, somewhat cylindrical, protrusion extending from the male joining edge, beyond the skins. A bottom of the protrusion provides a cradle wall for supporting the pivot 25 and a top of the protrusion provides meeting surface 20b for snap-fit connection with the joining end 16. The herniated web 26 has two ridges 28 that meet the curved web 15 of the joining end 16 at two places. These ridges 28 were designed to permit alternative, or additional bonding with adhesives, as the ridges 28 keep a controlled gap for the adhesive, which can be applied on either or both the curved web 15 and herniated web 26 prior to assembly. The two ridges 28 also maintain a gap necessary for GMAW at 20b. A gap between the skins of the two profiles, and between the skin and pivot 25 are provided, and near slots 29 are provided below the gaps, to permit Gas Metal Arc Welding (GMAW) to join the skins, as best seen in FIG. 9B.

Figure 10:
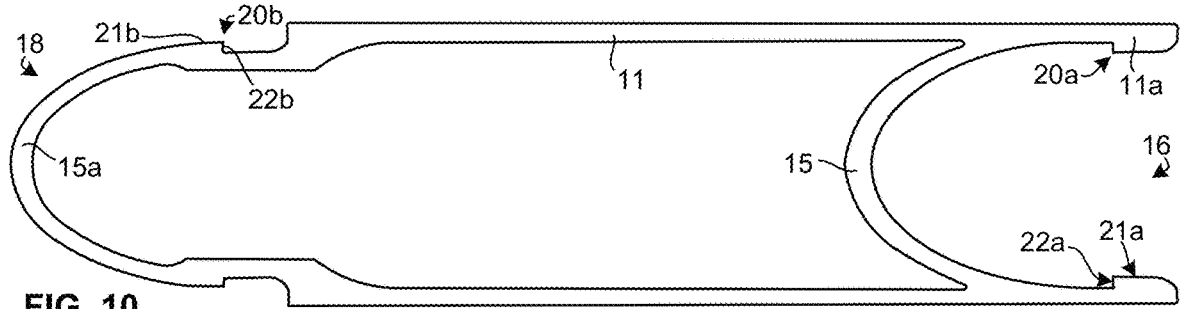
FIG. 10 is a schematic illustration of a profile having complementary curved proximal webs at both meeting faces.

FIG. 10 is a schematic illustration of a profile having a male end 18 and female end 16, both of which having complementary snap-fit features 20a,b. Female end 16 is similar to FIG. 6A,B, but with a semi-elliptical web, with a minor axis marginally greater than the skin separation. Male end is not so much herniated, as much as the skins are smoothly joined by a semi-elliptical section 15a, which is interrupted only by a snap-fit recess and a thickening support therefor. The semi-elliptical section 15a protrudes from an edge formed by the snap-fit recess 20b, which can alternatively be seen as an end of the skins 11. An outer surface of the semi-elliptical section 15a matches an outwardly facing surface of curved web 15 at the female end 16 for easy insertion. In alternative embodiments, either the facing surfaces of the curved web 15 or semi-elliptical section 15a have ridges 28 for adhesive control. During snap-fit connection, the male end 18 will tend to compress more than the female end 16 will extend, given the proximity of the web 15 to the female end 18. This will tend to extend the semi-elliptical section 15a even further from the skin ends, and should ensure that contact is made between the extended end of the semi-elliptical section 15a and a middle of the web 15, prior to snap fit. Once contact is made, the web 15 may thin, and leading skin segments 11a may flex, but web 15 can only move forward against the extended end 15a. This tends to result in a progressively widened contact zone between the deformed semi-elliptical surfaces of meeting webs 15,15a throughout the later phases of the snap-fit. This can be ideal for distributing adhesive, and for pressure-sensitive adhesives, as long as sufficient force can be applied to snap-fit, relative to the resistance offered by the contact zone effects. Note that because the semi-elliptical section 15a meets the skins 11 in an unusual manner for a web, it is difficult to say where a root centre would be. If the curved web 15a is understood to include all material added to the planar skins, the root centre would lie well behind the retraction surface 22b. The line segment joining root centres is recessed from the first joining edge by twice a minimum thickness of the first web (nearly $14 \times t_w$), but is not nearly 50% more than that of the retraction surface.

EXAMPLES

Various examples of the present invention have been produced, and have shown advantages in snap fit resilience, and reduced plastic deformation. Profiles of for FSW joining (similar to FIG. 6) and GMAW (similar to FIG. 10) were extruded using a 4 inch press, with an 850 ton capacity, giving an extrusion ratio of 19 for both designs. Two alloys were used with the composition falling in the range of the AA6005A and the AA6061 according to the aluminum association standard. The AA6005A was an alloy developed with a Magnesium/Silicon ratio ~1 in order to increase the extrudability and decrease the quench sensitivity compared to the AA6061 (which has this ratio ~2). The aluminum billets were heated to 500° C. prior to the extrusion and the ram speed was set to 7 mm/s for the AA6005A alloy and to 6 mm/s for the AA6061, in order to obtain an exit temperature near 550° C. Afterwards, the profiles were cooled by air forced at a rate of 170° C./min in the critical temperature range (500° C. to 250° C.). After cooling to the room temperature, the profiles were stretched by 0.5% (in the extruded direction). A scrap length of 1 m was discarded from front and back of all the profiles. A natural aging was carried out on both types of profile, at temperatures of 175° C. for 8 hours, to improve mechanical strength. The tensile yield strength for the AA6005A was 260 MPa and the ultimate tensile strength was 290 MPa. For the AA6061, the yield was 280 MPa and the ultimate strength was 305 MPa.

Figure 10A:
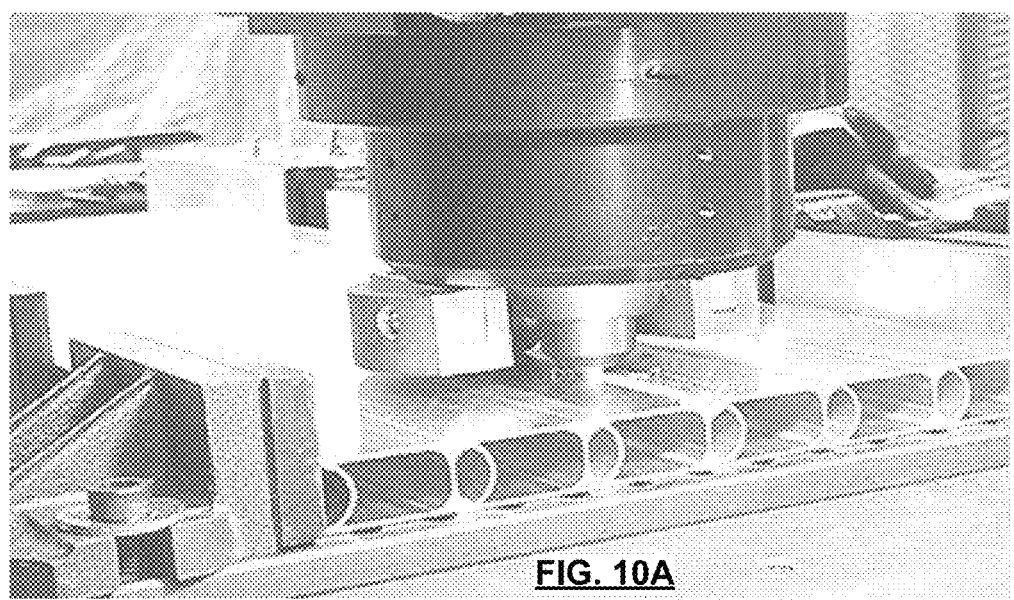
FIG. 10A is a photograph of short segment profiles according to FIG. 1 being FSW joined on both sides in an assembly of 6 profiles.
Figure 10B:
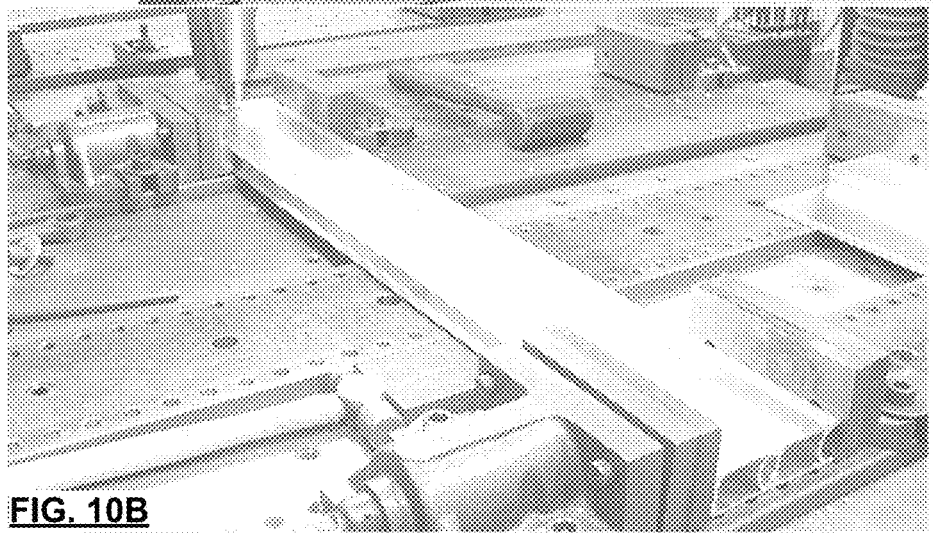
FIG. 10B is a photograph of short segment profiles according to FIG. 1 being FSW joined with minimal tooling.

FIGS. 10A,B are photographs of FSW joining of profiles according to the embodiment of FIG. 6. FIG. 10A shows the joining of 6 profiles clamped together. No cross member is required to cover the profiles to retain the unjoined profiles during the FSW process. FIG. 10B shows minimized tooling for joining two profiles, which are only clamped at opposite ends.

Figure 11:
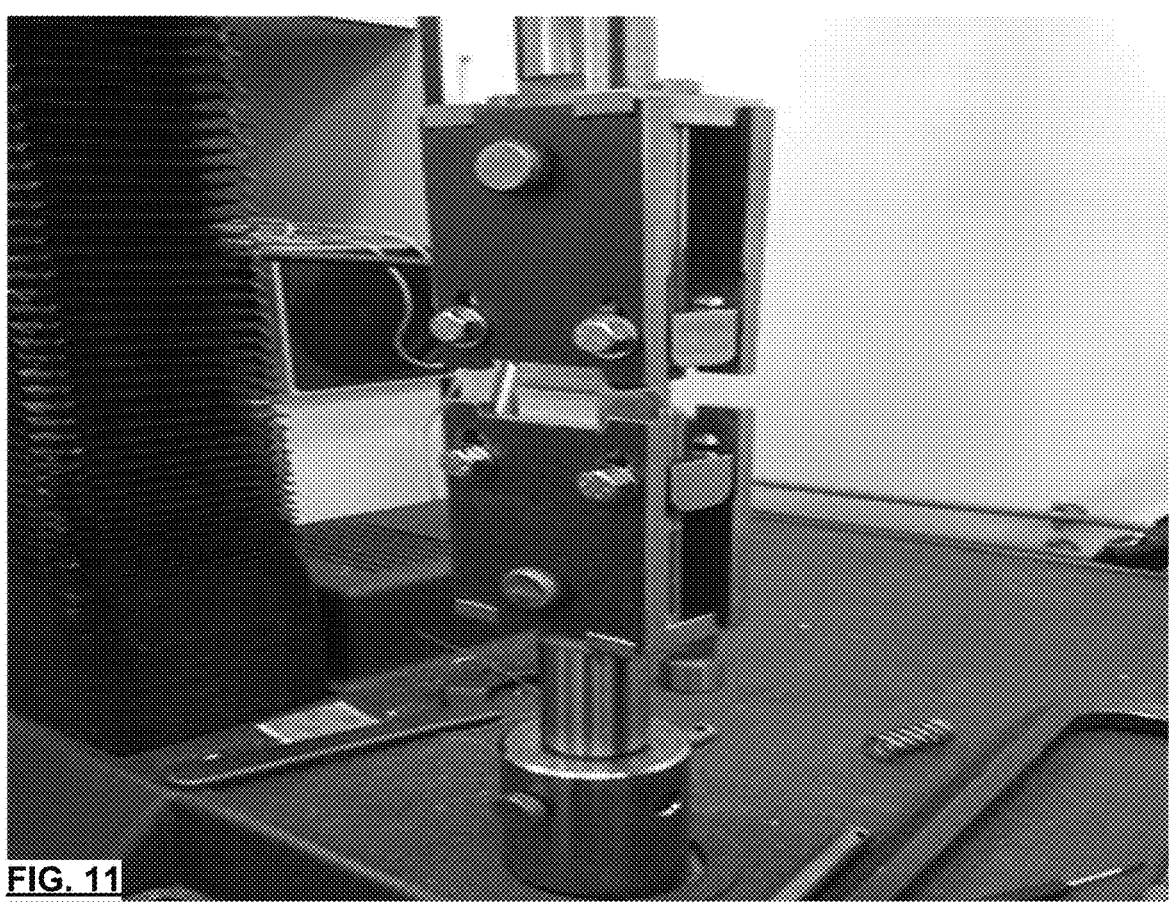
FIG. 11 is a photograph of short segment profiles under tensile load test.
Figure 12:
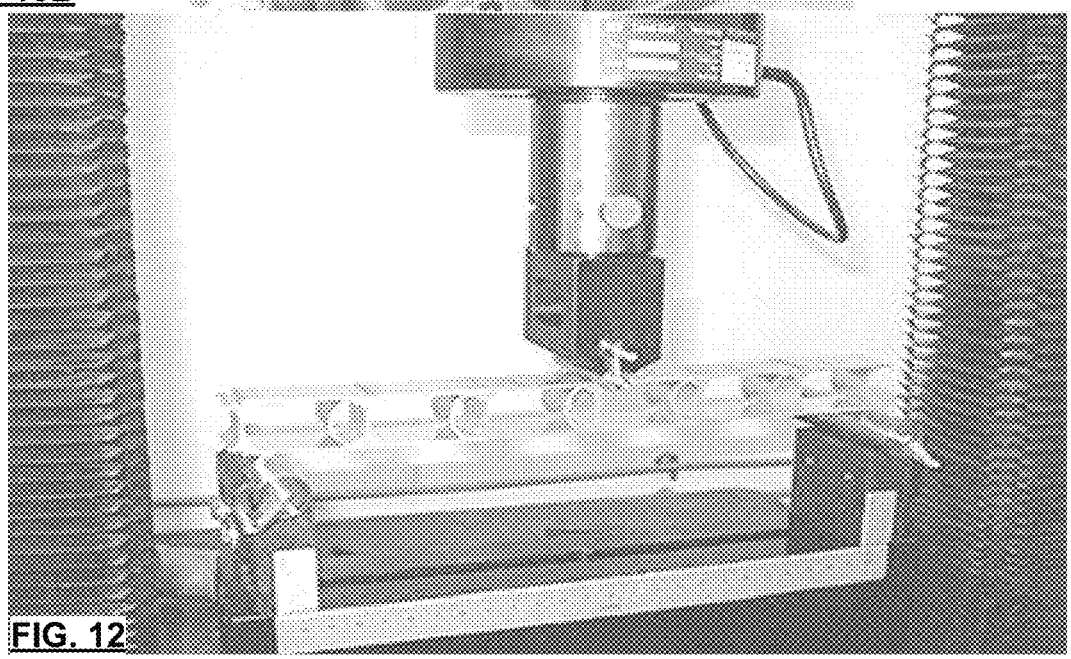
FIG. 12 is a photograph of a 3 point bending test to which the panel was subjected.

FIG. 11 is a photograph of a panel of two FSW joined profiles, subjected to tensile static load testing in compression/extension. FIG. 12 is a photograph of a panel formed by FSW joining of 6 profiles subject to a 3 point bending test.

Panels were tested by snap-fit connecting these profiles, and by welding some of them. Two processes were used for welding the AA6005A extruded material: friction stir welding (FSW) and gas metal arc welding (GMAW). For FSW, due to the mechanical nature of the process (solid-state joining), the extruded profiles must resist the process loads subjected to it during joining. This behavior was taken into account in the design phase as the FSW tool dimensions (11.0 mm shoulder diameter, 5.0 mm pin diameter and 3.15 mm pin length) were determined based on the maximum static admissible side (transverse) load from the snap-fit i.e. 3.2 kN. The FSW process parameters used during testing were: rotational speed of 1500 RPM, travel speed of 0.7 m/min and a vertical downforce of 4.0 kN. The recorded side load during testing was 1.7 kN which was well below the admissible side load.

The static strength was also measured upon tensile testing of the FSW joint which reached 191 MPa (65.9% joint efficiency). The joint efficiency value is over the ISO 13919 requirement for FSW on AA6xxx aluminium alloys (50%). The snap-fit profile itself, without any welding, sustains a tensile strength of 112.5 MPa which dictates a joint efficiency of 38.8% over the base material.

For GMAW, the welding was done using a Lincoln Electric 455 Power Wave source and the parameters used were: welding current of 185 A; travel speed of 0.9 m/min; and wire feed rate of 8.0 m/min. The filler wire was ER4043 with a diameter of 1.2 mm. No static strength was recorded for this joint configuration.

Figure 13:
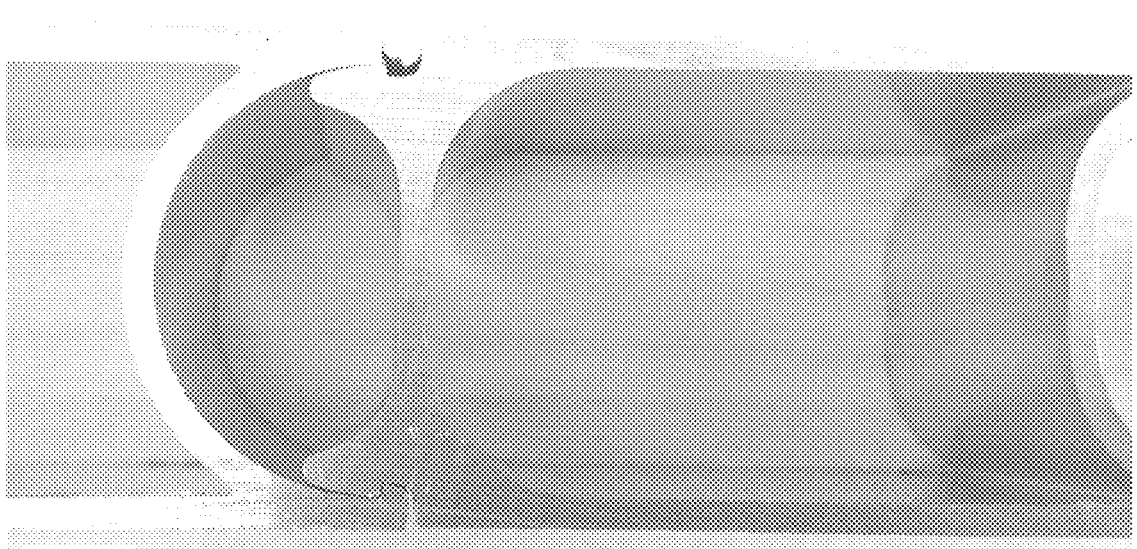
FIG. 13 is a photograph of a FSW-type profile (snap fit only) after tensile load test.
Figure 14A:
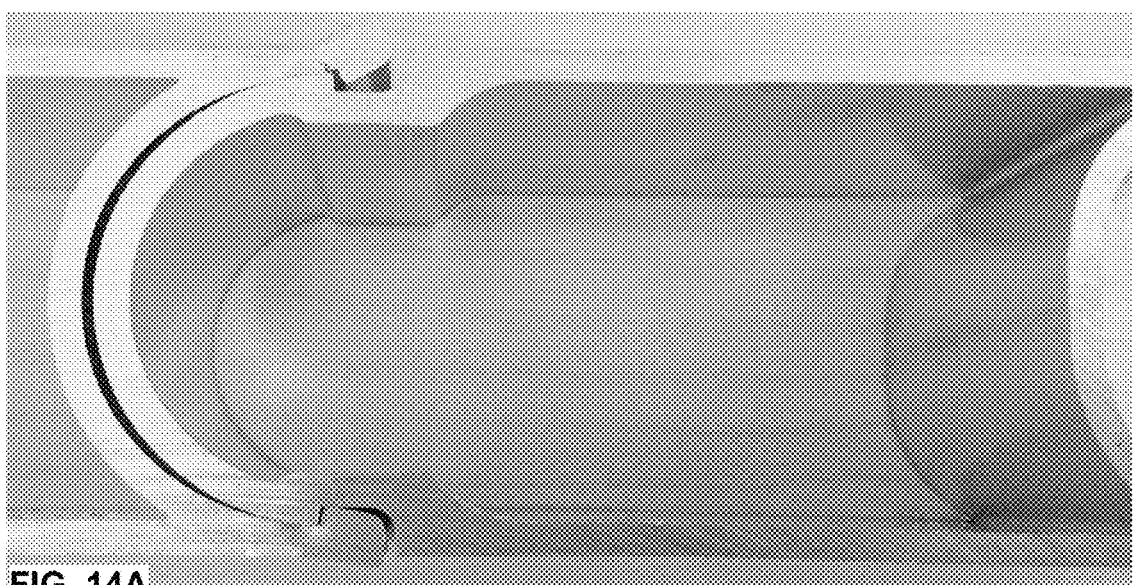
FIG. 14A,B are photographs of a GMAW-type profiles (respectively snap fit only, and GMAW joined) after tensile load test.
Figure 14B:
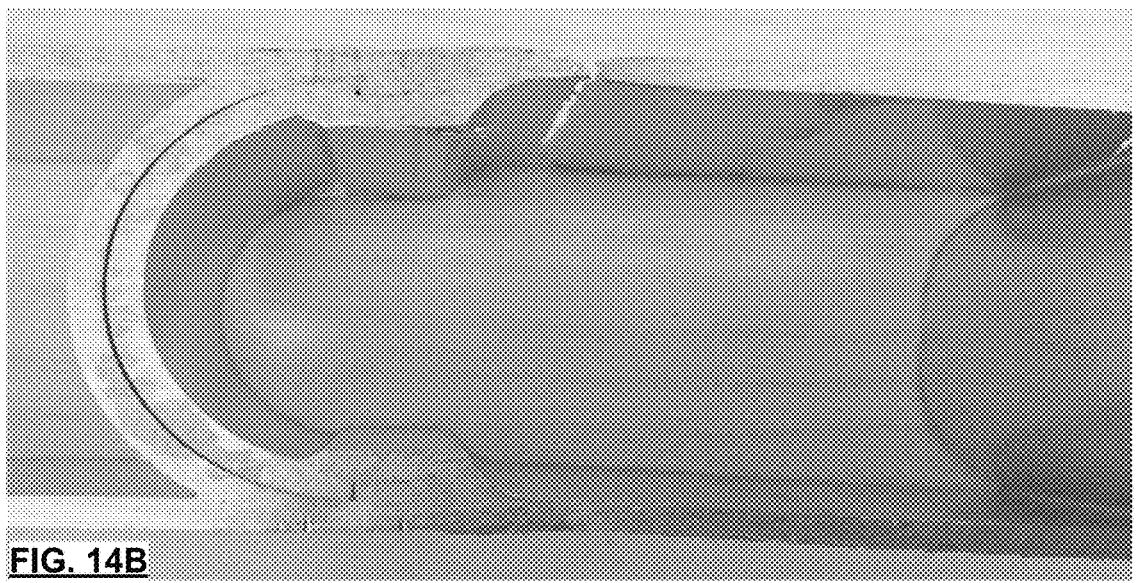

Table 1 shows panel properties observed of joined profiles of two types. The first type is photographed as FIG. 13. Specifically FIG. 13 shows the snap-fit only connected profiles after static tensile testing. The profile broke at the female end's snap fit feature, along the retraction sloped surface. A similar panel was friction stir welded at both snap fit joints, and had nearly double the ultimate tensile stress, but eventually broke at a periphery of a nugget of the FSW join. FIGS. 14A,B are photographs of the second type of profile, which is similar to the embodiment of FIG. 10. FIG. 14A shows the snap fit only panel after static tensile test, which failed at female end snap fit features, and FIG. 14B shows the GMAW welded panel after the same test. The GMAW welding improved an ultimate tensile stress of the panel by about 75%, and failure was away from the joint.

TABLE 1

| Joint type | Static Tentile Test - Ultimate Tensile Stress (MPa) | Static 3 point bend - Ultimate load (N) |
| --- | --- | --- |
| Base metal | 290 | N.A. |
| Joint I FSW | 197 | 1850 |
| Joint I Snap fit only | 106 | 1925 |

TABLE 1-continued

| Joint type | Static Tentile Test - Ultimate Tensile Stress (MPa) | Static 3 point bend - Ultimate load (N) |
| --- | --- | --- |
| Joint II GMAW | 182 | 1229 |
| Joint II Snap fit only | 104 | 1190 |

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A metallic extruded profile having two skins with inner, and outer surfaces, in which:
   the skins are interconnected by at least two webs that integrally meet the inner surfaces of both skins at respective roots;
   an outer periphery of the profile includes a first joining edge; and
   snap-fit features on the first joining edge permit the profile to snap fit together with a complementary profile joining edge, by deforming at least the skins and a first of the at least two webs, the first web being the closest of the at least two webs to the snap-fit features of the first joining edge;
wherein:
the first web is curved;
a curvature of the first web is visible viewing an extrusion edge of the profile, the curvature comprising a maximum deviation of the first web from a line segment connecting the first web's root centres that is at least twice the first web's mean thickness; and
the profile is adapted to deform during snap-fit deformation with the first web elastically deforming to change a separation of root centres, and the skins between the first web and a neighbouring web deforming elastically.

2. The profile of claim 1 wherein the profile is adapted to deform during snap-fit deformation to limit plastic deformation of the first web to affect less than 5% of a length of the first web.

3. The profile of claim 1 where the first web arcs away from the first joining edge.

4. The profile of claim 1 where the snap-fit features on the first joining edge are designed to spread apart during snap-fit deformation, and snap-fit deformation increases a length of the line segment, and increases a radius of curvature of the first web.

5. The profile of claim 1 where each web other than the first web, except possibly a second web nearest a second joining edge opposite the first joining edge, is a primarily planar sheet of constant thickness away from the root of said each web.

6. The profile of claim 5 where said each web is oriented locally perpendicular to the skins, or at a same angle of 30-90° with respect to the skin.

7. The profile of claim 1 where the first web viewed along an extrusion edge of the profile defines the curvature with at least one section of the first web consisting of a uniform thickness sheet, of constant curvature.

8. The profile of claim 7 where the first web has a uniform thickness, away from the root of the first web.

9. The profile of claim 7 where the first web away from the root of the first web has a uniform thickness except at the at least one section, which is thinner.

10. The profile of claim 1 where the first web includes exactly one curved section, the curve having a shape that is approximately parabolic, elliptical, circular, hyperbolic or cycloidal.

11. The profile of claim 1 where: the first web includes at least one curved section; and the first web is defined by one or more substantially linear, uniform thickness sheets at one or more locations away from the at least one curved section.

12. The profile of claim 1 where the webs and skins have uniform respective thicknesses away from the roots, these thicknesses differing by less than 50%.

13. The profile of claim 1 wherein the profile comprises a second joining edge opposite the first joining edge, the second joining edge being complementary to the first joining edge with a second web closest the second joining edge; wherein the second joining edge has snap fit features complementary to those of the first joining edge, permitting snap-fit connections of another instance of the profile at either joining end, using the snap-fit features and complementary snap-fit features.

14. The profile of claim 13 wherein the second web has a larger radius bend at the root than any other web of the profile, is a flat web oriented locally 90° to the skins, and has a greatest mean thickness among all webs and the skins of the profile.

15. The profile of claim 13 wherein the second web is a curved web with a complementary curvature to that of the first web.

16. The profile of claim 1 wherein the snap fit features on a first side of the first joining edge comprise a pair of meeting surfaces defined by sloped surfaces on entrance and retraction sides, respectively, and a land between the sloped surfaces, for coupling by application of a compressive force between aligned profiles, the retraction side having a steeper slope than the entrance side.

17. The profile of claim 16 wherein the snap fit features on a second side of the first joining edge opposite the first side, comprise: a sloped meeting surface, and one of a complementary detent or recess; or one of a cradle surface and complementary cylindrical pivot.

18. The profile according to claim 1 wherein the first web includes at least one section having a mean radius of curvature of between 0.25 and 0.75 times a separation of the skins.

19. A metallic extruded profile having two skins with inner, and outer surfaces, in which:
the skins are interconnected by at least two webs that integrally meet the inner surfaces of both skins at respective roots;
an outer periphery of the profile includes a first joining edge; and
snap-fit features on the first joining edge permit the profile to snap fit together with a complementary profile joining edge, by deforming the skins and the first web, the snap-fit features including a sloped entrance surface extending from a joining edge proximal point to a first web proximal point for wedging open the first joining edge;
wherein:
a first web, closest to the snap-fit features of the first joining edge, is curved;
a curvature of the first web is visible viewing an extrusion edge, the curvature comprising a maximum deviation of the first web from a line segment connecting the first web's root centres that is at least twice the first web's mean thickness; and
the line segment is recessed from the first joining edge by at least one of: a distance that is at least three times a mean thickness of the first web in an undeformed state; and at least 50% further than the first web proximal point.

20. A method for supporting a snap-fit connection of a metallic extruded profile comprising two parallel skins interconnected by a set of at least two webs, the method comprising:
providing snap-fit features on complementary leading edges of the profile, the snap-fit features including at least one detent mechanism;
providing a first leading web of a first of the leading edge that extends between both skins, the first leading web having a shape, viewed in the extruded direction, having at least an approximate curvature, and a length of the web being at least 15% more than a distance between the respective joins with the skins; and
during snap fit, spreading deformation over both the first leading web and the skins to limit plastic deformation of the profile,
whereby after snap fit connection, elasticities of both the first leading web and the skins act cooperatively to increase snap-fit resiliency.

* * * * *